United States Patent [19]
Arata

[11] Patent Number: 6,068,219
[45] Date of Patent: May 30, 2000

[54] SINGLE SURFACE MULTI AXIS AIRCRAFT CONTROL

[75] Inventor: Allen A. Arata, Hawthorne, Calif.

[73] Assignee: Northrop Grumman Corporation, Los Angeles, Calif.

[21] Appl. No.: 09/059,471

[22] Filed: Apr. 13, 1998

[51] Int. Cl.[7] .......................... B64C 15/00; B64C 29/00; B64C 3/44
[52] U.S. Cl. .................. 244/219; 244/12.1; 244/23 C
[58] Field of Search .................. 244/12.2, 23 C, 244/36, 203, 219

[56] References Cited

U.S. PATENT DOCUMENTS

| | | | |
|---|---|---|---|
| 3,193,215 | 7/1965 | Dunham | 244/12 |
| 4,026,500 | 5/1977 | Grow | 244/36 |
| 4,166,595 | 9/1979 | Ango | 244/20 |
| 4,208,025 | 6/1980 | Jefferson | 244/12.2 |
| 4,247,066 | 1/1981 | Frost et al. | 244/219 |
| 4,386,748 | 6/1983 | Jordan | 244/12.2 |
| 4,651,953 | 3/1987 | Kim | 244/12.1 |
| 4,667,898 | 5/1987 | Greenhalgh | 244/46 |
| 5,156,358 | 10/1992 | Gerhardt | 244/36 |
| 5,170,963 | 12/1992 | Beck, Jr. | 244/12.2 |
| 5,255,881 | 10/1993 | Rao | 244/199 |
| 5,322,242 | 6/1994 | Tracy | 244/36 |
| 5,518,204 | 5/1996 | Tracy | 244/36 |
| 5,538,201 | 7/1996 | Gerhardt | 244/204 |
| 5,794,893 | 8/1998 | Diller et al. | 244/215 |
| 5,897,076 | 4/1999 | Tracy | 244/36 |

Primary Examiner—Peter M. Poon
Assistant Examiner—Charles R. Ducker, Jr.
Attorney, Agent, or Firm—Terry J. Anderson; Karl J. Hoch, Jr.

[57] ABSTRACT

In accordance with the present invention, there is provided an aerodynamic control device for integrated use with an aircraft having an inboard lifting member. The inboard lifting member having a leading edge, a pair of opposing distal edges and a trailing edge. The control device is provided with a movable outboard member which extends substantially about the leading, distal and trailing edges of the inboard lifting member and is spaced apart therefrom. The outboard member is provided with a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

68 Claims, 4 Drawing Sheets

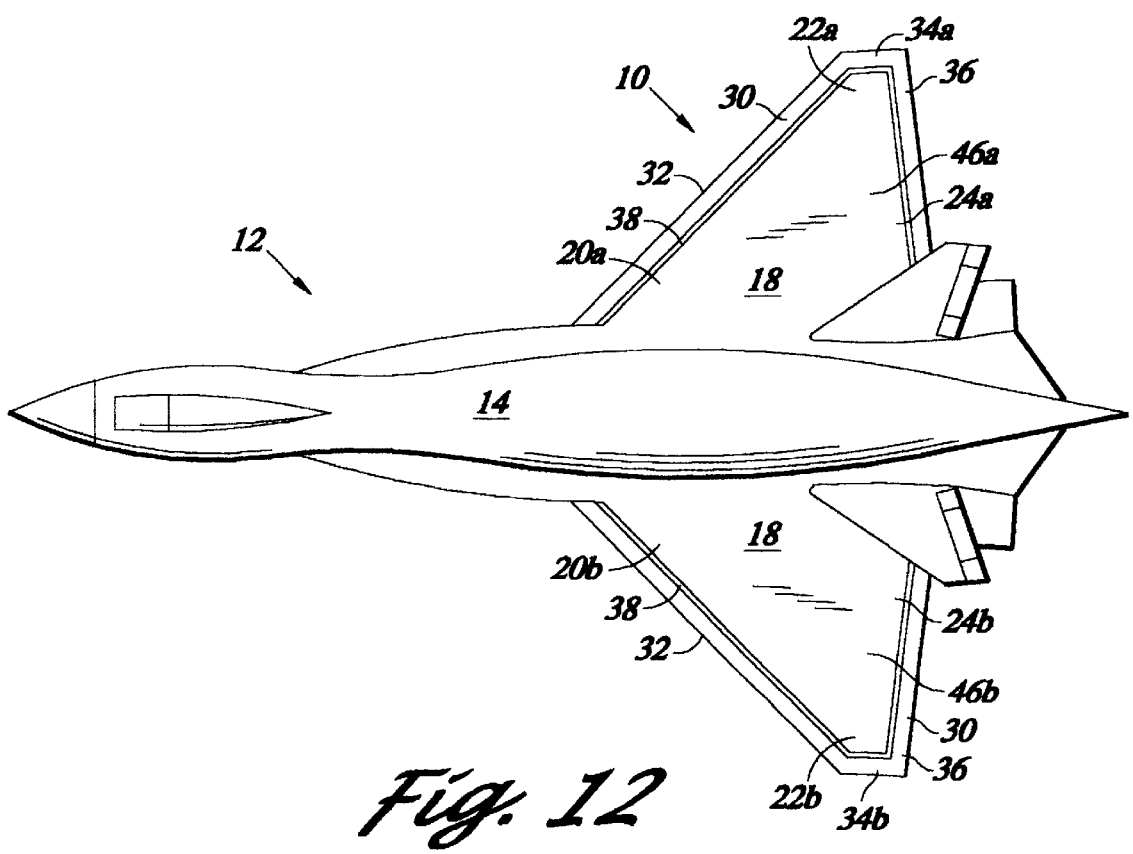

SINGLE SURFACE MULTI AXIS AIRCRAFT CONTROL

FIELD OF THE INVENTION

The present invention relates generally to aircraft aerodynamic control surfaces, and more particularly to an aircraft having an aerodynamic inboard lifting member and a outboard member which selectively move relative to the inboard lifting member.

BACKGROUND OF THE INVENTION

Conventional fixed winged aircraft are provided with a variety of aerodynamic control surfaces which include, for example, flaps, elevators, ailerons, trim tabs, and rudders. These control surfaces cooperatively operate to increase or decease lift over a given localized aerodynamic control surface for achieving pitch, yaw and roll control of the aircraft. Such control surfaces are used in both traditional winged aircraft and in modern stealthy designs, such as the delta wing and the F-117.

These control surfaces are typically rigid structures which are rotably attached to the wings or body (i.e., aerodynamic lifting surfaces) of the aircraft in a hinge-like fashion. Operation of the control surfaces typically forms gaps and/or abrupt changes in surface contours at or about the hinge area. Such gaps and abrupt changes are undesirable for a number of reasons. The gaps and abrupt changes tend to increase the drag on the aircraft, give rise to the potentiality that foreign objects and/or debris may become caught thereat, and increase the radar signature of the aircraft.

In addition, conventional control surfaces are usually located at the trailing edges of the wings and fins of the aircraft. In order to operate the control surfaces, the associated actuators and supporting pneumatic piping and/or electrical wiring must also be housed at these locations. Because these locations are typically spatially constrained, assembly and subsequent maintenance of the control surfaces and their actuation mechanisms are complex and labor intensive operations.

It is therefore evident that there exists a need in the art for an aircraft aerodynamic control surface which mitigates gaps and abrupt surface contour changes, and mitigates aircraft radar cross section signature, reduces the complexity of assembly and maintenance operations associated with conventional control surface designs.

SUMMARY OF THE INVENTION

In accordance with the present invention, there is provided an aerodynamic control device for integrated use with an aircraft having an inboard lifting member. The inboard lifting member having a leading edge, a pair of opposing distal edges and a trailing edge. The control device is provided with a movable outboard member which extends substantially about the leading, distal and trailing edges of the inboard lifting member and is spaced apart therefrom. The outboard member is provided with a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

In the preferred embodiment of the present invention, the control device is provided with a flexible transition section. The transition section extends between the inboard lifting member and the outboard member to form an uninterrupted airfoil surface extending about the inboard lifting member and the outboard member for achieving desired aerodynamic control of the aircraft. The transition section may be formed of an elastomeric material. The transition section is attached to the outboard member and the inboard lifting surface in a fashion which does not produce any abrupt surface contour changes, such as steps or gaps. Thus, the airfoil surface is continuous and smooth. Selective contouring of the airfoil surface, via movement of the outboard member, allows for pitch, yaw and roll control of the aircraft. Therefore, it is contemplated that the present invention facilitates single surface multi-axis aircraft control.

Preferably, the aerodynamic control device is provided with a plurality of actuators mechanically coupling the outboard member to the inboard lifting surface for selectively moving the outboard member relative to the inboard lifting member. The actuators may be electrical, hydraulic and pneumatic devices and combinations thereof.

In the preferred embodiment of the present invention, the outboard member is an unitary uninterrupted member and laterally spans the inboard lifting member. In addition the outboard member is substantially rigid and may be formed of composite non-metalic materials. In contrast, the transition section comprises an elastomeric material.

It is contemplated that the aircraft in which the present invention is practiced may be delta-shaped. Other aircraft shapes are contemplated including more traditional designs having a fuselage with fixed wings. Other embodiments of the present invention include incorporating the above described aerodynamic control device into an aircraft wing and fuselage as well as an all wing type aircraft. The wings of the aircraft are provided with wing tips. The distal edges of the inboard lifting member and the distal edge portions of the outboard member are disposed at the wing tips.

In addition, there is provided a method of aerodynamic control of an aircraft comprising the initial step providing an aircraft as disclosed above. Aerodynamic control of the aircraft is achieved by selectively moving the outboard member relative to the inboard lifting member thereby contouring the airfoil surface. The outboard member is selectively moved relative to the inboard lifting member via a plurality of actuators which mechanically couple the outboard member to the inboard lifting member.

Vertical movement of the outboard member relative to the inboard lifting member results in pitch control of the aircraft. The aircraft defines a lateral axis and rotational movement of the outboard member about this axis also results in pitch control of the aircraft. In addition, the aircraft defines a longitudinal axis and rotational movement of the outboard member about this axis results in yaw and roll control of the aircraft.

As such, based on the foregoing, the present invention mitigates the inefficiencies and limitations associated with prior art aerodynamic aircraft control systems. Importantly, because the transition section joins the outboard member and the inboard lifting member in a smooth continuous manner, undesirable gaps and abrupt surface contour changes are mitigated. Thus, the gaps and abrupt changes in the aircraft surface contours occurring about conventional control surfaces are mitigated. As such, the present invention tends to decrease drag, reduce or eliminate the potentiality of foreign objects becoming caught, and decrease the radar cross section signature of the aircraft, in comparison to conventionally control aircraft.

In addition, conventional control surfaces are usually located at the trailing edges of the wings and fins of the aircraft. In order to operate the control surfaces, the associated actuators and supporting pneumatic piping and/or electrical wiring must be housed at these spatially constrained locations. Assembly and maintenance of the outboard member integrated into the aircraft of the present invention are relatively simple in comparison to the complex and labor intensive operations associated with conventional control surfaces due to their integration into confined spaces. It is contemplated that the transition section is removable, thereby allowing free access from the exterior of the aircraft to the actuators contained therein.

Advantageously, the aircraft constructed in accordance with the present invention tends to mitigate the effects of lightning strikes or other electrical phenomenon contacting the aircraft. In aircraft having conventional airfoil surfaces (i.e., elevators, trim tabs, etc.) upon being struck by electromagnetic waves, the electrical discharge tends to be concentrated at various regions about the aircraft. This is due in part to the discontinuous nature of the airfoil surfaces with respect to their integration with the rest of the aircraft. Such concentrations have the potential for damaging onboard electronic equipment. The aerodynamic control device of the present invention, however, has relatively few component parts which are smoothly integrated with the rest of the aircraft. Additionally, the outboard member is spread about a significant portion of the aircraft, especially in the case where it is of a unitary uninterrupted design, and distributes electrical discharge rather than locally concentrating electrical discharge.

Accordingly, the present invention represents a significant advance in the art.

BRIEF DESCRIPTION OF THE DRAWINGS

These, as well as other features of the present invention, will become more apparent upon reference to the drawings wherein:

FIG. 12 is a top view of an alternative embodiment of the present invention.

DETAILED DESCRIPTION OF THE PREFERRED EMBODIMENT

Figure 7:
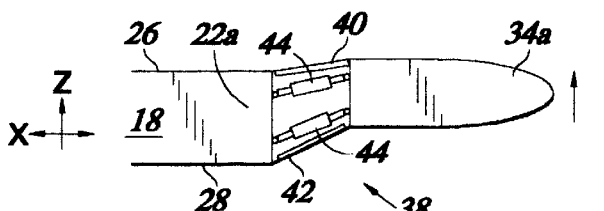
FIG. 7 is an enlarged partial cross-sectional view of the aircraft as shown in FIG. 5 along the B—B axis with the outboard member moved vertically upward.
Figure 8:
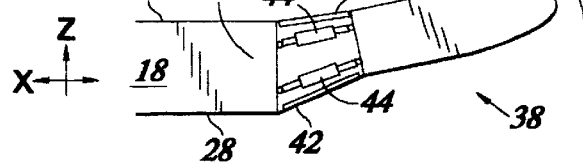
FIG. 8 is an enlarged partial cross-sectional view of the aircraft as shown in FIG. 5 along the B—B axis with the outboard member rotated counter clockwise about the longitudinal Y-axis.
Figure 9:
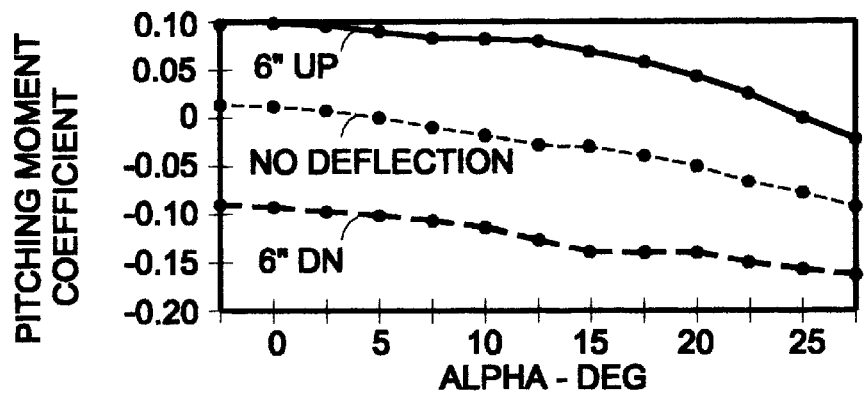
FIG. 9 is a graph representing pitching moment coefficient data associated with an exemplar embodiment of the present invention.
Figure 10:
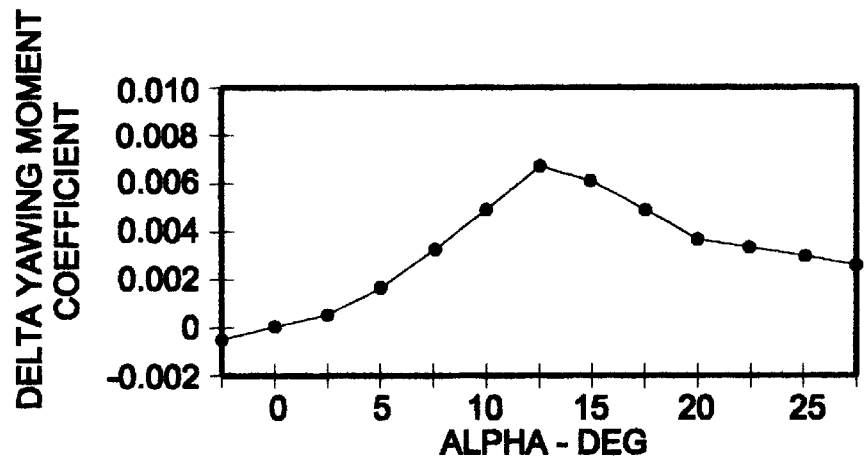
FIG. 10 is a graph representing yawing moment coefficient data associated with an exemplar embodiment of the present invention.
Figure 11:
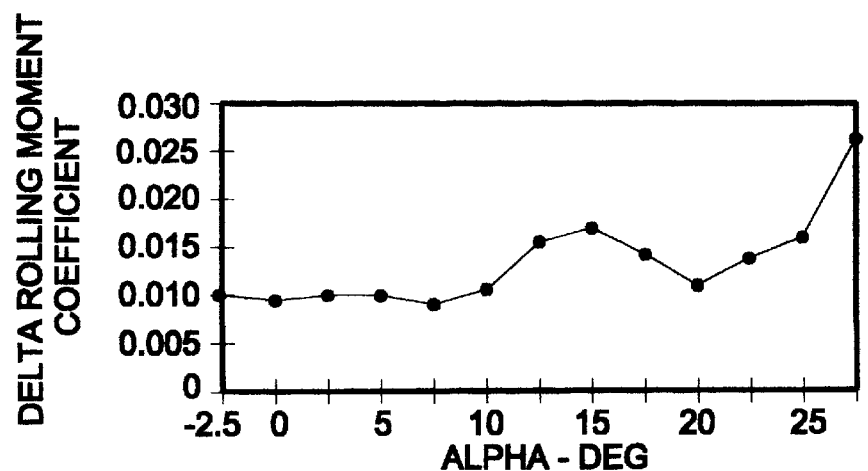
FIG. 11 is a graph representing rolling moment coefficient data associated with an exemplar embodiment of the present invention.

Referring now to the drawings wherein the showings are for purposes of illustrating a preferred embodiment of the present invention only, and not for purposes of limiting the same, FIGS. 1–8 illustrate an aircraft which is constructed in accordance with the present invention. As will be described in more detail below, the aircraft is provided with an outboard member for aerodynamic control of the aircraft. In a ddition, FIGS. 9–11 present test data associated with an exemplar embodiment of the present invention.

In accordance with the present invention, there is provided an aerodynamic control device 10 for integrated use with an aircraft 12 having an inboard lifting member 18. The inboard lifting member 18 is provided with an upper skin 26 and a lower skin 28. The inboard lifting member is further provided with a leading edge 20, a pair of opposing distal edges 22a–b, and a trailing edge 24. The control device 10 is provided with a movable outboard member 30 which extends substantially about the leading, distal and trailing edges 20, 22a–b, 24 of the inboard lifting member 18 and is spaced apart therefrom. The outboard member 30 is provided with leading, distal and trailing edge portions 32, 34a–b, 36. The leading, distal and trailing edge portions 32, 34a–b, 36 are collectively movable in unison relative to the inboard lifting member 18. Preferably, the control device 10 is further provided with a flexible transition section 38 having upper and lower surfaces 40, 42. The upper surface 40 of the transition section 38 extends between the outboard member 30 and the upper skin 26 of the inboard lifting member 18. The lower surface 42 of the transition section 38 extends between the outboard member 30 and the lower skin 28 of the inboard lifting member 18. Thus, the outboard member 30 is vertically interposed between the upper and lower skins 26, 28 of the inboard lifting member 18. The outboard member 30 is attachable to the inboard lifting member 18 such that the leading, distal and trailing edge portions 32, 34a–b, 36 are vertically movable in an uniform direction relative to the inboard lifting member 18.

Importantly, the aircraft defines a lateral axis and the outboard member 30 may rotate about this axis. The leading and trailing edge portions 32, 36 are vertically movable in opposing directions relative to the inboard lifting member 18. Such vertically opposing movement rotates the outboard member 30 about the later axis. Similarly, the aircraft defines a longitudinal axis and the opposing distal edge portions 34a–b of the outboard member 30 are vertically movable in opposing directions relative to the inboard lifting member 18. The upper and lower skins 26, 28 of the inboard lifting member 18, the upper and lower surfaces 40, 42 of the transition section 38, and the outboard member 30 collectively define a continuous airfoil surface which may be selectively contoured via the movement of the outboard member 30 relative to the inboard lifting member 18 for achieving desired aerodynamic control of the aircraft 12. The transition section 38 is attached to the outboard member 30 and the inboard lifting member 18 in a fashion which does not produce any abrupt surface contour changes, such as gaps. Thus, the airfoil surface is continuous and smooth. Selective contouring of the airfoil surface, via outboard member movement, allows for pitch, yaw and roll control of the aircraft 12. Therefore, it is contemplated that the present invention facilitates single surface multi-axis aircraft control.

In the preferred embodiment of the present invention, the aerodynamic control device 10 is provided with a plurality of actuators 44 which mechanically couple the outboard member 30 to the inboard lifting member 18 for selectively moving the outboard member 30 relative to the inboard lifting member 18. Preferably, the actuators 44 carry the majority of the loads associated with supporting the outboard member 30. Thus, the transition section 38 carries little or no loads associated with the outboard member 30. It is contemplated that the actuators 44 are selected from those well known to one of ordinary skill in the art and may be electro-mechanical, hydraulic, pneumatic devices, for example. In addition, one of ordinary skill in the art will recognize suitable methods of attachment for the actuators 44.

Preferably, the outboard member 30 is substantially rigid and may comprise a composite non-metalic material, for example. In contrast, the transition section 38 is formed of an elastomeric material. In practice, the material type used for the outboard member 30 is contemplated to be selected from those well known to one of ordinary skill in the art.

The outboard member 30 is formed of a unitary uninterrupted member and laterally spans the width of the inboard lifting member 18. Although, in the embodiment depicted in FIGS. 1–9, the outboard member 30 extends completely around the inboard lifting member 18, the outboard member 30 does not have to completely circumscribe the inboard lifting member 18 in this manner. In addition, although the outboard member 30 is depicted as a single member, it is contemplated that the outboard member 30 may be formed of several components which act cooperatively. In either embodiment, it is contemplated that the actuators 44 control the movement(s) of the outboard member 30. Although not shown, in practice, the actuators 44 communicate with and are commanded by a central control device 48, which may take the form of a computer processor for example. The central control device 48 would be connected to a set of pilot controls 50.

As can be seen, in the embodiment of the present invention depicted in FIGS. 1–9, the inboard lifting member 18 is delta-shaped. As can be seen the leading edges 20a, 20b are angularly disposed. The leading edges 20a, 20b blend with the distal edges 22a, 22b and the distal edges 22a, 22b blend with the traling edges 24a, 24b. Other aircraft shapes are contemplated, including those having a more traditional fuselage with fixed wing shape. FIG. 12 depicts an alternative embodiment of the present invention, in the case of a traditional design having a fuselage 14 with fixed wings 46a–b. The each of the wings 46a–b are provided with an inboard lifting member 18. An outboard member 30 extends substantially about each inboard lifting member 18. In such an embodiment, it is contemplated that the each of the outboard members 30 could pass through the fuselage 14 to form a unitary uninterrupted member. While, the outboard member 30 is shown on the wings 16, the outboard member may be integrated with other aerodynamic lifting surfaces, such as tails and canards, for example.

In addition, there is provided a method of aerodynamic control of an aircraft 10 comprising the initial step providing an aircraft 10 as disclosed above. Aerodynamic control of the aircraft 10 is achieved by selectively moving the leading, trailing and lateral edge portions 32, 34a–b, 36 of the outboard member 30 relative to the inboard lifting member 18 thereby contouring the airfoil surface. The outboard member 30 is selectively moved relative to the inboard lifting member 18 via the plurality of actuators 44 which mechanically couple the outboard member 30 to the inboard lifting member 18.

Figure 1:
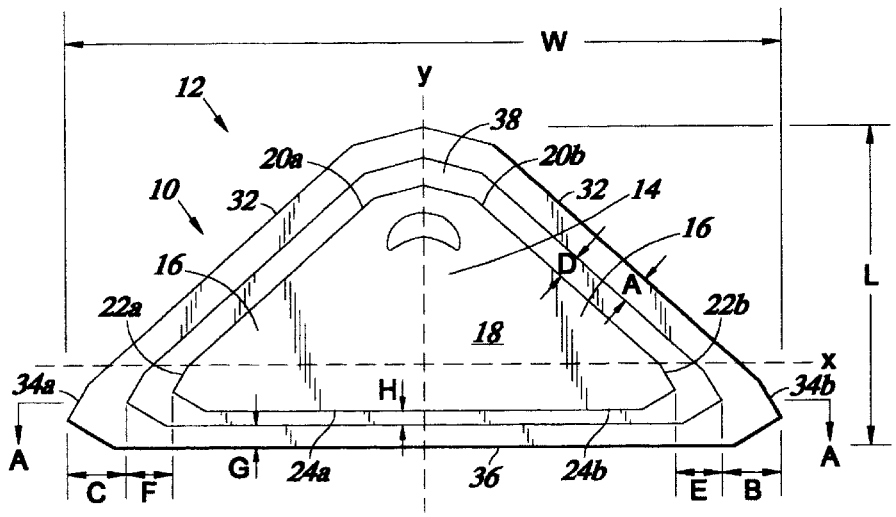
FIG. 1 is a top view of an embodiment of the aircraft of the present invention.
Figure 2:
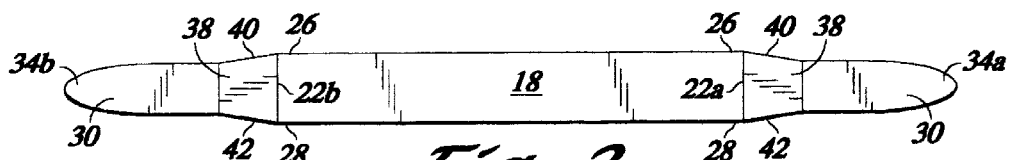
FIG. 2 is a cross-sectional view of the aircraft depicted in FIG. 1 along axis A—A with the outboard member in an undeflected state.
Figure 3:
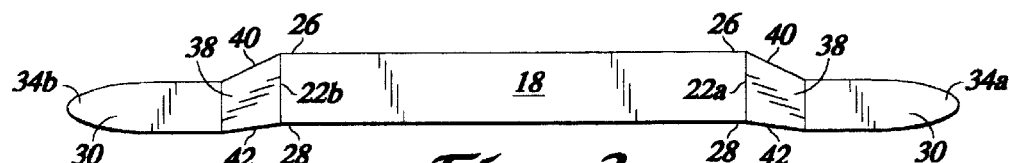
FIG. 3 is a cross-sectional view of the aircraft depicted in FIG. 1 along axis A—A with the outboard member moved vertically downward.
Figure 6:
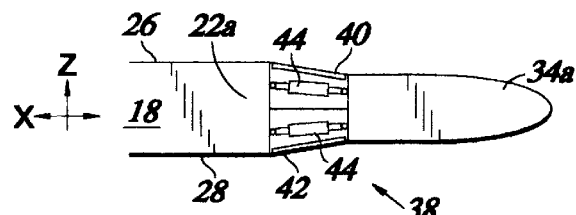
FIG. 6 is an enlarged partial cross-sectional view of the aircraft as shown in FIG. 5 along the B—B axis with the outboard member in an undeflected state.

Referring now to FIGS. 2 and 6, the outboard member 30 is shown in an undeflected state. Likewise, the upper and lower surfaces 40, 42 of the transition section 38 are shown in an unflexed state. The outboard member 30 may be uniformly vertically moved relative to the inboard lifting member 18 in order to achieve in pitch control of the aircraft 12. FIG. 3 depicts the outboard member 30, which includes the leading, distal and trailing edge portions 32, 34a–b, 36, deflected downward along the Z-axis. FIG. 7 depicts the outboard member 30 deflected upward along the Z-axis. The aircraft 12 defines a lateral axis (X-axis) and the outboard member 30 may be rotated about this axis. Thus, the outboard member 30 may be rotated forward and backward. This rotational movement of the outboard member 30 also results in pitch control of the aircraft 10.

Figure 4:
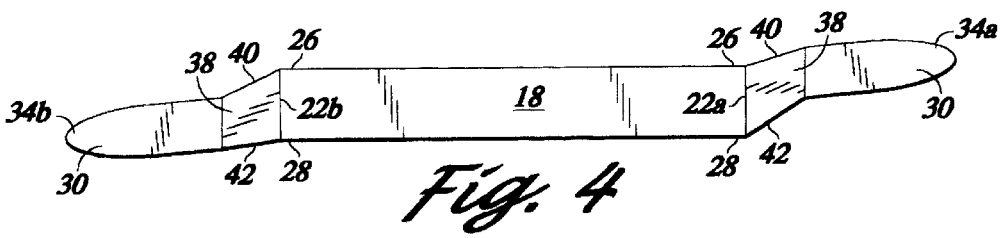
FIG. 4 is a cross-sectional view of the aircraft depicted in FIG. 1 along axis A—A with the outboard member rotated counter clockwise about the longitudinal Y-axis.
Figure 5:
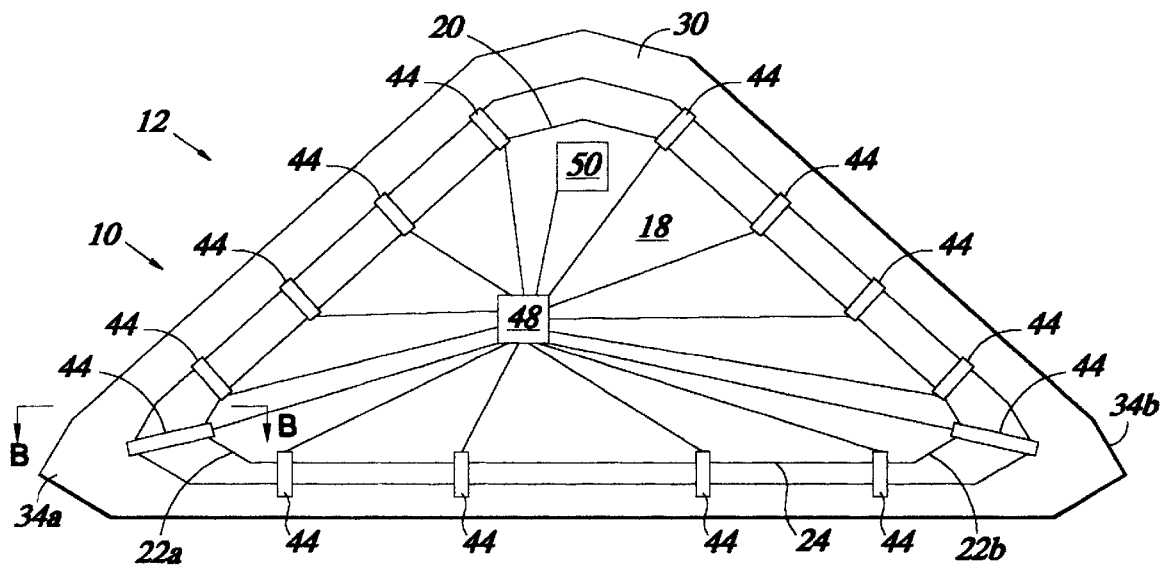
FIG. 5 is an enlarged partial top view of the aircraft of FIG. 1 depicted without the transition section and with symbolically illustrated actuators.

In addition, the aircraft 12 defines a longitudinal axis (Y-axis) and outboard member 30 may be rotated about this axis. Referring now to FIGS. 4 and 8, the outboard member 30 is depicted as rotated counter clockwise about the longitudinal Y-axis of the aircraft 12. This rotational movement results in yaw and roll control of the aircraft 12.

The upper and lower skins 26, 28 of the inboard lifting member 18, the upper and lower surfaces 40, 42 of the transition section 38, and the outboard member 30 collectively define an airfoil surface of the aircraft 10. The use of the transition section 38 to integrate the outboard member 30 with inboard lifting member 18 results in an airfoil surface which is continuous and smooth. As can be seen in FIGS. 3, 4, 7 and 8, upon movement or deflection of the outboard member 30 relative to the inboard lifting member 18, the upper and lower surfaces 40, 42 of the transition section 38 take on an S-shape. The surface contour of the upper skin 26 of the inboard lifting member 18 smoothly continues along the upper surface 40 of the transition section 38 and blends with the outboard member 30. Similar continuity is observed with the lower skin 28, the transition section lower surface 42 and outboard member 30. Thus, the present invention avoids gaps and abrupt surface contour changes which may be present in conventionally controlled aircraft.

Preferably, the transition section 38 comprises an elastomeric material. The material should be flexible and yet durable to withstand the conditions encountered during flight. It is contemplated that the material is chosen from those well known to one of ordinary skill in the art and, for example, may be rubber or silicon. In the preferred embodiment, upper and lower surfaces 40, 42 of the transition section 38 are removable, thereby allowing free access from the exterior of the aircraft 12 to the actuators 44 contained therein. The method of attachment of the transition section 38 is chosen from those well known to one of ordinary skill in the art.

In order to obtain wind tunnel test data, four aircraft test models were constructed in accordance with the present invention. These test models were similar in configuration to those depicted in FIGS. 1–8. It is contemplated that the aircraft models used to generate the wind tunnel data represent one embodiment of the present invention and is discussed herein for illustrative purposes only. One subscale test model was constructed to represent the following full scale dimensions: maximum wingspan (W) of 40 feet parallel to the X-axis; length (L) of 38 feet along the Y-axis; X-Y planar depth (A) of the outboard member 30 of 1 foot; X-Y planar depth (B) of the outboard member 30 of 1.5 feet; X-Y planar depth (C) of the outboard member 30 of 1.5 feet; X-Y planar depth (D) of the transition section 38 of 1 foot; X-Y planar depth (E) of the transition section 38 of 2.5 feet; and X-Y planar depth (F) of the transition section 38 of 2.5 feet; X-Y planar depth (G) of the outboard member 30 of 1.5 feet; and X-Y planar depth (H) of the transition section 38 of 1.5 feet. The model represented a full scale X-Y planar area of approximately 935 square feet.

The test models varied as a function of the deflection of the outboard member 30. The first model was constructed with no deflection. The second and third models were constructed with the entire outboard member 30 vertically deflected six (6) inches upward and downward, respectively. In the fourth test model the rigid outboard member 30 was rotated about the Y-axis such that the distal edge portion 22b was deflected upward six (6) inches and the other distal edge portion 22a was deflected downward six (6) inches.

Referring now to the graph presented in FIG. 9, the vertical axis represents pitching moment coefficient and the horizontal axis represents aircraft angle of attack. As can be seen, three test data curves are plotted. The middle curve represents the pitching moment coefficient of the aircraft model without any deflection of the outboard member 30. The upper curve plots the pitching moment coefficient corresponding to the model with the outboard member 30 deflected upward six (6) inches. The lower curve plots the pitching moment coefficient corresponding to the model with the outboard member 30 deflected downward six (6) inches.

A pitching moment coefficient equal to zero corresponds to an aircraft that is cruising without maneuvering. For example, referring to the middle curve, the data indicates that the aircraft could fly at four degrees angle of attack without any control member movements or deflections because the curve crosses the pitching moment coefficient axis with a value of zero at four degrees of angle of attack. Referring to the upper curve, the data indicates that the aircraft could fly at twenty-five degrees angle of attack with six inches of upward movement or deflection of the outboard member 30, because the curve crosses the pitching moment coefficient axis with a value of zero at twenty-five degrees of angle of attack. Thus, trimmed flight at any angle of attack between four and twenty-five degrees can be achieved with less than six inches of upward control member movement. Likewise, trimmed flight below four degrees angle of attack can be achieved with less than six inches of downward control member movement.

In addition, the test data indicates that the deviation or spread between the upper and lower curves is relatively constant at a value of approximately 0.2 pitching moment coefficient. Thus, at an angle of attack of −2.5 degrees through 27.5 degrees (a relatively high angle of attack), a flight envelope is available to the aircraft by moving the outboard member 30 up to six inches either up or down. The constant nature of the pitching moment coefficient curves is particularly interesting because it has been observed that with some conventional control surfaces comparable curves tend to converge at high angles of attack.

As mentioned above, wind tunnel test data was obtained from an aircraft model having a outboard member 30 rotated about the Y-axis such that the lateral edge 26a was deflected upward six (6) inches and the other lateral edge 26b was deflected downward six (6) inches. Test data for this model are presented in FIGS. 10 and 11. Referring now to the graph presented in FIG. 10, the vertical axis represents delta yawing moment coefficient and the horizontal axis represents aircraft angle of attack. The delta yawing moment coefficient represents that difference between the yawing moment coefficient with and without control member deflection. Referring now to the graph presented in FIG. 11, the vertical axis represents delta rolling moment coefficient and the horizontal axis represents aircraft angle of attack. The delta rolling moment coefficient represents that difference between the rolling moment coefficient with and without outboard member deflection.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aerodynamic control device for integrated use with an aircraft having an inboard lifting member having a leading edge, a pair of opposing distal edges and a trailing edge, the aerodynamic control device comprising:

a movable outboard member extending substantially about the leading, distal and trailing edges of the inboard lifting member and spaced apart therefrom, the outboard member being a unitary uninterrupted member, the outboard member having a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

2. The aerodynamic control device of claim 1 further comprising a flexible transition section extending between the inboard lifting member and the outboard member to form an uninterrupted airfoil surface extending about the inboard lifting member and the outboard member for achieving desired aerodynamic control of the aircraft.

3. The aerodynamic control device of claim 1 wherein the flexible transition section comprises an upper portion extending between the outboard member and the inboard lifting member to form an uninterrupted airfoil surface extending about the inboard lifting member and the outboard member for achieving desired aerodynamic control of the aircraft.

4. The aerodynamic control device of claim 1 wherein the flexible transition section comprises an elastomeric material.

5. The aerodynamic control device of claim 1 further comprising a plurality of actuators mechanically coupling the outboard member to the inboard lifting member for selectively moving the outboard member relative to the inboard lifting member.

6. The aerodynamic control device of claim 5 wherein the plurality of actuators are electro-mechanical devices.

7. The aerodynamic control device of claim 5 wherein the inboard lifting member defines a vertical axis and the actuators being sized and configured to move the outboard member in an uniform direction relative to the inboard lifting member along the vertical axis.

8. The aerodynamic control device of claim 5 wherein the inboard lifting member defines a vertical axis and the actuators being sized and configured to move the leading and trailing edge portions of the outboard member in opposing directions relative to the inboard lifting member along the vertical axis.

9. The aerodynamic control device of claim 5 wherein the inboard lifting member defines a lateral axis and the actuators being sized and configured to rotate the outboard member about the lateral axis.

10. The aerodynamic control device of claim 5 wherein the actuators being sized and configured to move the opposing distal edge portions in opposite directions relative to the inboard lifting member.

11. The aerodynamic control device of claim 5 wherein the inboard lifting member defines a longitudinal axis and the actuators being sized and configured to rotate the outboard member about the longitudinal axis.

12. The aerodynamic control device of claim 1 wherein the outboard member laterally spans the inboard lifting member.

13. The aerodynamic control device of claim 1 wherein outboard member is substantially rigid.

14. The aerodynamic control device of claim 13 wherein outboard member comprises a composite resin material.

15. The aerodynamic control device of claim 1 wherein the inboard lifting member comprises a wing.

16. The aerodynamic control device of claim 15 wherein the wing having a pair of opposing wing tips and the distal edge portions of the outboard member being respectively disposed thereat.

17. The aerodynamic control device of claim 15 wherein the wing is delta-shaped.

18. An aircraft wing for use with an aircraft, the wing comprising:
  an inboard lifting member having leading, distal and trailing edges; and
  a movable outboard member extending substantially about the leading, distal and trailing edges of the inboard lifting member and spaced apart therefrom, the outboard member having leading, distal and trailing edge portions which are collectively movable in unison in relation to the inboard lifting member to form an uninterrupted airfoil surface extending about the inboard lifting member and the outboard member comprised of a composite non-metallic material for achieving desired aerodynamic control of the aircraft.

19. The aircraft wing of claim 18 further comprising a flexible transition section extending between the inboard lifting member and the outboard member to form an uninterrupted airfoil surface extending about the inboard lifting member and the outboard member for achieving desired aerodynamic control of the aircraft.

20. The aircraft wing of claim 18 wherein the flexible transition section comprises an upper portion extending between the outboard member and the inboard lifting member to form an uninterrupted airfoil surface extending about the inboard lifting member and the outboard member for achieving desired aerodynamic control of the aircraft.

21. The aircraft wing of claim 18 wherein the flexible transition section comprises an elastomeric material.

22. The aircraft wing of claim 18 further comprising a plurality of actuators mechanically coupling the outboard member to the inboard lifting member for selectively moving the outboard member relative to the inboard lifting member.

23. The aircraft wing of claim 22 wherein the plurality of actuators are electro-mechanical devices.

24. The aircraft wing of claim 22 wherein the inboard lifting member defines a vertical axis and the actuators being sized and configured to move the outboard member in an uniform direction relative to the inboard lifting member along the vertical axis.

25. The aircraft wing of claim 22 wherein the aircraft defines a vertical axis and the actuators being sized and configured to move the leading and trailing edge portions of the outboard member in opposing directions relative to the inboard lifting member along the vertical axis.

26. The aircraft wing of claim 22 wherein the aircraft defines a lateral axis and the actuators being sized and configured to rotate the outboard member about the lateral axis.

27. The aircraft wing of claim 26 wherein aircraft defines a vertical axis and the actuators being sized and configured to move the distal edge portion relative to the inboard lifting member along the vertical axis while rotating the leading and trailing edge portions of the outboard member.

28. The aircraft wing of claim 22 wherein the aircraft defines a longitudinal axis and the actuators being sized and configured to rotate the outboard member about the longitudinal axis.

29. The aircraft wing of claim 18 wherein the outboard member laterally spans the inboard lifting member.

30. The aircraft wing of claim 18 wherein outboard member is substantially rigid.

31. An aerodynamic control device for integrated use with an aircraft having an inboard lifting member having a leading edge, a pair of opposing distal edges and a trailing edge, the aerodynamic control device comprising:
  a movable uninterrupted outboard member extending substantially about the leading, distal and trailing edges of the inboard lifting member and spaced apart therefrom, the outboard member having a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

32. An aerodynamic control device for integrated use with an aircraft having an inboard lifting member having a leading edge, a pair of opposing distal edges and a trailing edge, the aerodynamic control device comprising:
  a movable outboard member extending substantially about the leading, distal and trailing edges of the inboard lifting member and spaced apart therefrom, the outboard member having a leading edge portion, a pair of opposing distal edge portions, and a trailing edge portion which are collectively movable in unison in relation to the inboard lifting member, the outboard member comprising a composite resin material, the outboard member comprising a composite resin material; and
  a flexible transition section extending between the inboard lifting member and the outboard member to form an uninterrupted airfoil surface extending about the inboard lifting member and the outboard member for achieving desired aerodynamic control of the aircraft.

33. An aircraft wing for use with an aircraft, the wing comprising:
  an inboard lifting member having leading, distal and trailing edges; and
  a movable outboard member extending substantially about the leading, distal and trailing edges of the inboard lifting member and spaced apart therefrom, the outboard member having leading distal and trailing edge portions which form a unitary uninterrupted member collectively movable in relation to the inboard lifting member, the outboard member comprising a composite resin material; and a flexible transition section extending between the inboard lifting member and the outboard member to form an uninterrupted airfoil surface extending about the inboard lifting member and the outboard member for achieving desired aerodynamic control of the aircraft.

34. An aircraft comprising:

an inboard lifting member having a leading edge, a pair of opposing distal edges and a trailing edge; and a movable outboard member extending substantially about the leading, distal and trailing edges of the inboard lifting member and spaced apart therefrom, the outboard member having a leading edge portion, a pair of opposing distal edge portions, and a trailing edge portion which form a unitary uninterrupted member collectively movable in relation to the inboard lifting member to form an uninterrupted airfoil surface extending about the inboard lifting member and the outboard member for achieving desired aerodynamic control of the aircraft, the outboard member comprising a composite resin material.

35. A method of aerodynamic control of an aircraft comprising the steps of:

(a) providing the aircraft with a aerodynamic inboard lifting member having a leading edge, a distal edge and a trailing edge;

(b) providing the aircraft with a movable outboard member extending substantially about the leading, distal and trailing edges of the inboard lifting member and spaced apart therefrom, the outboard member having leading, distal and trailing edge portions which form a unitary uninterrupted member, the outboard member comprising a composite resin material;

(c) attaching the outboard member to the inboard lifting member such that the leading, distal and trailing edge portions of the outboard member are collectively moveable in unison in relation to inboard lifting member to form an uninterrupted airfoil surface extending about the inboard lifting member and the outboard member; and (d) selectively moving the outboard member relative to the inboard lifting member thereby contouring the airfoil surface for achieving desired aerodynamic control of the aircraft.

36. The method of aerodynamic control of claim 35 wherein step (d) comprises selectively moving the outboard member relative to the inboard lifting member via a plurality of actuators mechanically coupling the outboard member to the inboard lifting member.

37. The method of aerodynamic control of claim 35 wherein the aircraft defines a vertical axis and step (d) comprises moving the outboard member relative to the inboard lifting member along the vertical axis for achieving pitch control of the aircraft.

38. The method of aerodynamic control of claim 35 wherein the aircraft defines a vertical axis and wherein step (d) comprises moving the leading and trailing edge portions of the outboard member in opposing directions relative to the inboard lifting member along the vertical axis for achieving pitch control of the aircraft.

39. The method of aerodynamic control of claim 35 wherein the aircraft defines a longitudinal axis and wherein step (d) comprises rotating the outboard member about the longitudinal axis for achieving yaw control of the aircraft.

40. The method of aerodynamic control of claim 35 wherein the aircraft defines a longitudinal axis and wherein step (d) comprises rotating the outboard member about the longitudinal axis for achieving roll control of the aircraft.

41. An aerodynamic control device for integrated use with an aircraft having an inboard lifting member having a leading edge, a pair of opposing distal edges and a trailing edge, the aerodynamic control device comprising:

a movable outboard member extending substantially about the leading, distal and trailing edges of the inboard lifting member and spaced apart therefrom, the outboard member being a substantially rigid composite resin material having a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

42. The aerodynamic control device of claim 41 further comprising a flexible transition section extending between the inboard lifting member and the outboard member to form an uninterrupted airfoil surface extending about the inboard lifting member and the outboard member for achieving desired aerodynamic control of the aircraft.

43. The aerodynamic control device of claim 41 wherein the flexible transition section comprises an upper portion extending between the outboard member and the inboard lifting member to form an uninterrupted airfoil surface extending about the inboard lifting member and the outboard member for achieving desired aerodynamic control of the aircraft.

44. The aerodynamic control device of claim 41 wherein the flexible transition section comprises an elastomeric material.

45. The aerodynamic control device of claim 41 further comprising a plurality of actuators mechanically coupling the outboard member to the inboard lifting member for selectively moving the outboard member relative to the inboard lifting member.

46. The aerodynamic control device of claim 45 wherein the plurality of actuators are electro-mechanical devices.

47. The aerodynamic control device of claim 45 wherein the inboard lifting member defines a vertical axis and the actuators being sized and configured to move the outboard member in an uniform direction relative inboard lifting member along the vertical axis.

48. The aerodynamic control device of claim 45 wherein the inboard lifting member defines a vertical axis and the actuators being sized and configured to move the leading and trailing edge portions of the outboard member in opposing directions relative to the inboard lifting member along the vertical axis.

49. The aerodynamic control device of claim 45 wherein the inboard lifting member defines a lateral axis and the actuators being sized and configured to rotate the outboard member about the lateral axis.

50. The aerodynamic control device of claim 45 wherein the actuators being sized and configured to move the opposing distal edge portions in opposite directions relative to the inboard lifting member.

51. The aerodynamic control device of claim 45 wherein the inboard lifting member defines a longitudinal axis and the actuators being sized and configured to rotate the outboard member about the longitudinal axis.

52. The aerodynamic control device of claim 41 wherein the outboard member being a unitary uninterrupted member.

53. The aerodynamic control device of claim 41 wherein the outboard member laterally spans the inboard lifting member.

54. An aerodynamic control device for integrated use with an aircraft having an inboard lifting member comprises a wing having a leading edge, a pair of opposing distal edges and a trailing edge, the aerodynamic control device comprising:

a movable outboard member extending substantially about the leading, distal and trailing edges of the inboard lifting member and spaced apart therefrom, the outboard member having a leading edge portion, a pair of opposing distal edge portions, and a trailing edge portion which are collectively movable in unison in relation to the inboard lifting member to form an uninterrupted airfoil surface extending about the inboard lifting member and the outboard member for achieving desired aerodynamic control of the aircraft.

55. The aerodynamic control device of claim 54 wherein the wing having a pair of opposing wing tips and the distal edge portions of the outboard member being respectively disposed thereat.

56. The aerodynamic control device of claim 54 wherein the wing is delta-shaped.

57. The aerodynamic control device of claim 54 further comprising a flexible transition section extending between the inboard lifting member and the outboard member to form an uninterrupted airfoil surface extending about the inboard lifting member and the outboard member for achieving desired aerodynamic control of the aircraft.

58. The aerodynamic control device of claim 54 wherein the flexible transition section comprises an upper portion extending between the outboard member and the inboard lifting member to form an uninterrupted airfoil surface extending about the inboard lifting member and the outboard member for achieving desired aerodynamic control of the aircraft.

59. The aerodynamic control device of claim 54 wherein the flexible transition section comprises an elastomeric material.

60. The aerodynamic control device of claim 54 further comprising a plurality of actuators mechanically coupling the outboard member to the inboard lifting member for selectively moving the outboard member relative to the inboard lifting member.

61. The aerodynamic control device of claim 60 wherein the plurality of actuators are electro-mechanical devices.

62. The aerodynamic control device of claim 60 wherein the inboard lifting member defines a vertical axis and the actuators being sized and configured to move the outboard member in an uniform direction relative inboard lifting member along the vertical axis.

63. The aerodynamic control device of claim 60 wherein the inboard lifting member defines a vertical axis and the actuators being sized and configured to move the leading and trailing edge portions of the outboard member in opposing directions relative to the inboard lifting member along the vertical axis.

64. The aerodynamic control device of claim 60 wherein the inboard lifting member defines a lateral axis and the actuators being sized and configured to rotate the outboard member about the lateral axis.

65. The aerodynamic control device of claim 60 wherein the actuators being sized and configured to move the opposing distal edge portions in opposite directions relative to the inboard lifting member.

66. The aerodynamic control device of claim 60 wherein the inboard lifting member defines a longitudinal axis and the actuators being sized and configured to rotate the outboard member about the longitudinal axis.

67. The aerodynamic control device of claim 54 wherein the outboard member being a unitary uninterrupted member.

68. The aerodynamic control device of claim 54 wherein the outboard member laterally spans the inboard lifting member.

* * * * *